US007181347B2

(12) United States Patent
Moore

(10) Patent No.: US 7,181,347 B2
(45) Date of Patent: Feb. 20, 2007

(54) METHOD FOR THE 3-D PREDICTION OF FREE-SURFACE MULTIPLES

(75) Inventor: Ian Moore, Shelley (AU)

(73) Assignee: Westerngeco, L.L.C., Houston, TX (US)

( * ) Notice: Subject to any disclaimer, the term of this patent is extended or adjusted under 35 U.S.C. 154(b) by 646 days.

(21) Appl. No.: 10/668,927

(22) Filed: Sep. 23, 2003

(65) Prior Publication Data

US 2005/0065758 A1    Mar. 24, 2005

(51) Int. Cl.
*G01V 1/00* (2006.01)
*G01V 1/28* (2006.01)
*G01V 1/38* (2006.01)
*G06F 19/00* (2006.01)
*G06G 7/48* (2006.01)
*G06G 7/56* (2006.01)

(52) U.S. Cl. ............................ 702/14; 367/24; 367/73; 703/5

(58) Field of Classification Search .................. 702/14
See application file for complete search history.

(56) References Cited

U.S. PATENT DOCUMENTS

| | | | | |
|---|---|---|---|---|
| 4,887,243 | A | * 12/1989 | Pann | 367/24 |
| 5,986,973 | A | 11/1999 | Jericevic et al. | 367/24 |
| 6,625,543 | B1 | * 9/2003 | Bevc et al. | 702/14 |

FOREIGN PATENT DOCUMENTS

EP    0 112 715    4/1984

OTHER PUBLICATIONS

Bannagi, M.S. & Verschuur, Eric., 2003, *Enhanced, post-stack multiple prediction using demigration*: Delphi consortium annual report, Chapter 6.
Van Dedem, E.J. & Verschuur, D.J., 2002, *3D surface-related multiple prediction: a sparse inversion approach*, Delphi Imaging and Characterization Project, vol. XIII, Ann Report, Ch 6, pp. 95-134.
Kleemeyer, G., et al., *It's Magic—industry first 3D surface multiple elimination and pre-stack depth migration on ormen lange*: 65th Ann. Internat. Mtgl, Eur. Assn. Geosci. Eng., Expanded Abstracts, B043.

(Continued)

*Primary Examiner*—John Barlow
*Assistant Examiner*—Lisa Sievers
(74) *Attorney, Agent, or Firm*—Westerngeco, L.L.C.

(57) ABSTRACT

Method and apparatus for predicting surface multiples, which includes (a) selecting a target subsurface line (SSL); (b) selecting an input SSL within an aperture of the target SSL; (c) selecting a point on a line twice the distance between the input SSL and the target SSL, the point corresponding to a potential downward reflection point of the surface multiples for a trace; (d) generating a potential surface multiple for the trace corresponding to the point; (e) repeating steps (c) through (d) for each point on the line to generate an inline of potential surface multiples corresponding to each point on the line; (f) repeating steps (b) through (e) for each input SSL within the aperture of the target SSL to generate potential surface multiples for the trace corresponding to each input SSL within the aperture; and (g) adding the potential surface multiples to generate a surface multiple for the trace.

23 Claims, 5 Drawing Sheets

OTHER PUBLICATIONS

Levin, S.A., 2002, *Prestack poststack 3D multiple prediction*: 72nd Ann. Internat. Mtg., Soc. Expl. Geophys., Expanded Abstracts, SP3-05.

Nekut, A.G., *3D surface-related multiple prediction*, Amoco Exploration and Production Technology, 1998 SEG Expanded Abstracts.

* cited by examiner

METHOD FOR THE 3-D PREDICTION OF FREE-SURFACE MULTIPLES

BACKGROUND OF THE INVENTION

1. Field of the Invention

Embodiments of the present invention generally relate to marine seismic surveying and, more particularly, to a method for attenuating the effect of surface multiples in a marine seismic signal.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

Marine seismic surveying is a method for determining the structure of subterranean formations underlying bodies of water. Marine seismic surveying typically utilizes seismic energy sources and seismic receivers located in the water which are either towed behind a vessel or positioned on the water bottom from a vessel. The energy source is typically an explosive device or compressed air system which generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, though, motion sensors, such as geophones or accelerometers may be used. Both the sources and receivers may be strategically repositioned to cover the survey area.

Seismic waves, however, reflect from interfaces other than just those between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples. However, a larger set of multiples containing water-bottom multiples as a subset can be defined. The larger set includes multiples with upward reflections from interfaces between subterranean formations in addition to upward reflections from the water bottom. The multiples in the larger set have in common their downward reflections at the water surface and thus are called "surface multiples". FIG. 1, discussed below, provides examples of different types of reflections.

FIG. 1 shows a diagrammatic view of marine seismic surveying. The procedure is designated generally as 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interfaces below, and the downward reflector at the water surface 116 above, as described more fully below. Each time the reflected waves propagate past the position of a seismic receiver 110, the receiver 110 senses the reflected waves and generates representative signals.

Primary reflections are those seismic waves which have reflected only once, from the water bottom 112 or an interface between subterranean formations, before being detected by a seismic receiver 110. An example of a primary reflection is shown in FIG. 1 by raypaths 120 and 122. Primary reflections contain the desired information about the subterranean formations which is the goal of marine seismic surveying. Surface multiples are those waves which have reflected multiple times between the water surface 116 and any upward reflectors, such as the water bottom 112 or formation interfaces, before being sensed by a receiver 110. An example of a surface multiple which is specifically a water bottom multiple is shown by raypaths 130, 132, 134 and 136. The point on the water surface 116 at which the wave is reflected downward for the second time is generally referred to as the downward reflection point. The surface multiple starting at raypath 130 is a multiple of order one, since the multiple contains one reflection from the water surface 116. Two examples of general surface multiples with upward reflections from both the water bottom 112 and formation interfaces are shown by raypaths 140, 142, 144, 146, 148 and 150 and by raypaths 160, 162, 164, 166, 168 and 170. Both of these latter two examples of surface multiples are multiples of order two, since the multiples contain two reflections from the water surface 116. In general, a surface multiple is of order i if the multiple contains i reflections from the water surface 116. Surface multiples are extraneous noise which obscures the desired primary reflection signal.

Surface multiple attenuation is a prestack inversion of a recorded wavefield which removes all orders of all surface multiples present within the marine seismic signal. Unlike some wave-equation-based multiple-attenuation algorithms, surface multiple attenuation does not require any modeling of or assumptions regarding the positions, shapes and reflection coefficients of the multiple-causing reflectors. Instead, surface multiple attenuation relies on the internal physical consistency between primary and multiple events that must exist in any properly recorded marine data set. The information needed for the surface multiple attenuation process is already contained within the seismic data.

Various prior art methods have been tried for removal of surface multiples from recorded traces. It has been noted, for example, that the travel time for a surface multiple, the path of which is entirely in the water during an oceanographic expedition, is a function of the "offset", the distance between the source and receiver, and the number of times the multiple reflects from the surface. For example, if the multiple reflects from the surface once before being received by the microphone and the offset is zero, the multiple's travel time is exactly twice that of the principal waves. This fact has been used in various schemes to remove multiples.

Other methods involve complex ray tracing schemes which generate a synthetic multiple wave and subtract it from the actual wave to obtain a supposedly multiple free record. However, these methods are very awkward in that they require significant knowledge of the subsea structure as well as the ocean bottom configuration before the synthetic wave can be generated. Similar synthetic multiples can be generated using more accurate methods not directly involving ray tracing, e.g., field propagation techniques, but again these require detailed knowledge of at least the ocean bottom, as well as the shape of the subsea interfaces, and so are not as practical as would be desired.

Therefore, a need exists in the art for an improved method for removing the record of multiple surface reflection events from seismic records for data processing purposes.

SUMMARY OF THE INVENTION

Embodiments of the present invention are generally directed to a method for predicting a plurality of surface multiples for a plurality of traces in a record of seismic data. The method includes (a) selecting a target subsurface line; (b) selecting an input subsurface line within an aperture of the target subsurface line; (c) selecting a point on a line twice the distance between the input subsurface line and the target subsurface line, wherein the point corresponds to a potential downward reflection point of the surface multiples for a trace in the record; (d) generating a potential surface multiple for the trace corresponding to the point; (e) repeating steps (c) through (d) for each point on the line to generate an inline of potential surface multiples for the trace corresponding to each point on the line; (f) repeating steps (b) through (e) for each input subsurface line within the aperture of the target subsurface line to generate a plurality of potential surface multiples for the trace corresponding to each input subsurface line within the aperture; and (g) adding the plurality of potential surface multiples corresponding to each input subsurface line within the aperture to generate a surface multiple for the trace.

In one embodiment, the method includes (a) selecting a target subsurface line; (b) selecting an input subsurface line within an aperture of the target subsurface line; (c) applying a differential moveout correction to the input subsurface line; (d) performing a two dimensional surface multiple prediction on the input subsurface line to generate a sum of a plurality of potential surface multiples on an inline in each multiple contribution gather that corresponds to the target subsurface line, wherein the inline corresponds to the input subsurface line; (e) repeating steps (c) through (d) for every input subsurface line within the aperture to generate a plurality of sums of potential surface multiples on every inline in every multiple contribution gather that corresponds to the target subsurface line; (f) sorting the plurality of sums of potential surface multiples such that each sum of potential surface multiples corresponding to a trace in the record is adjacent to each other; and (g) adding the adjacent potential surface multiples corresponding to the trace to generate a surface multiple for the trace.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 1:
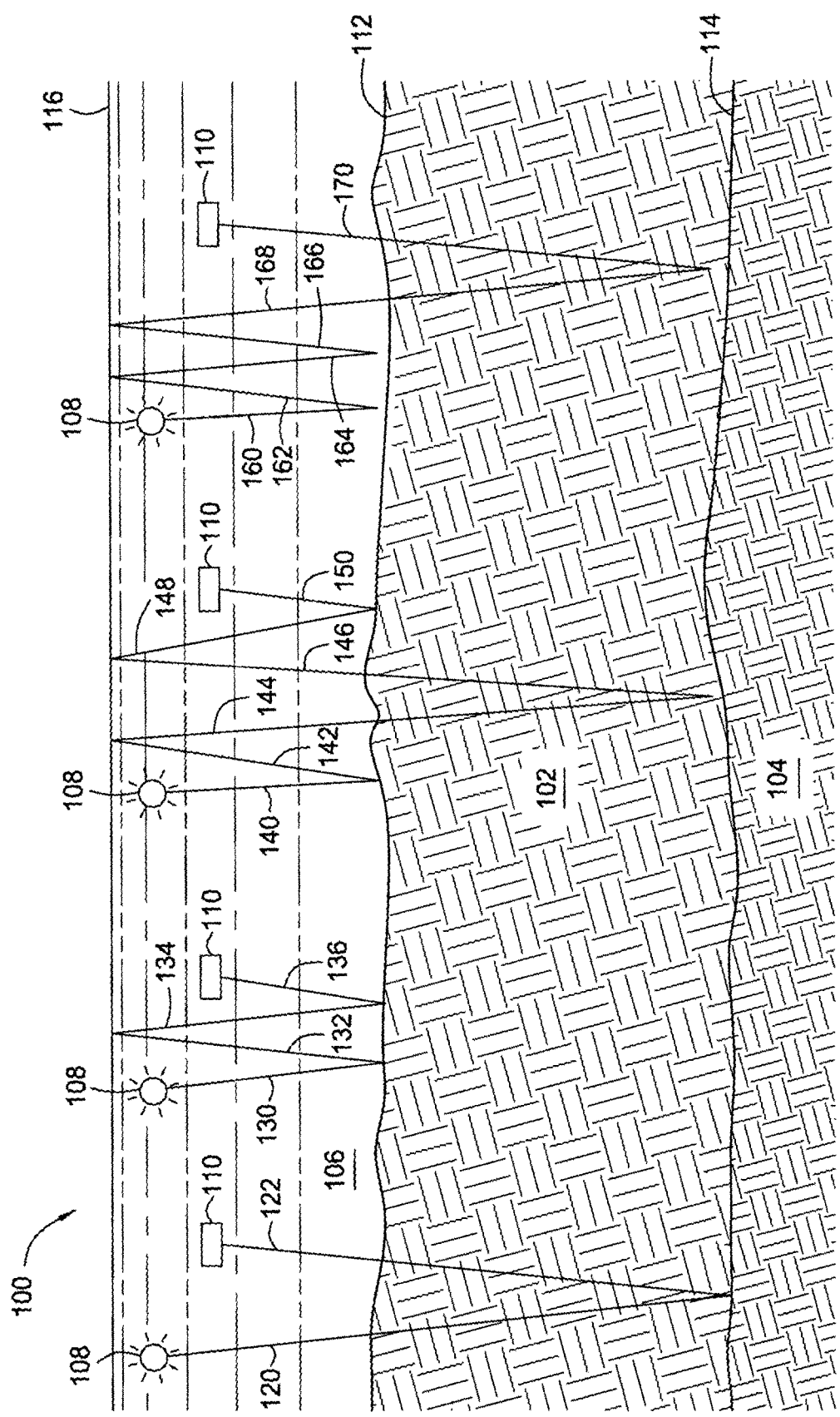
FIG. 1 illustrates a diagrammatic view of marine seismic surveying.
Figure 2:
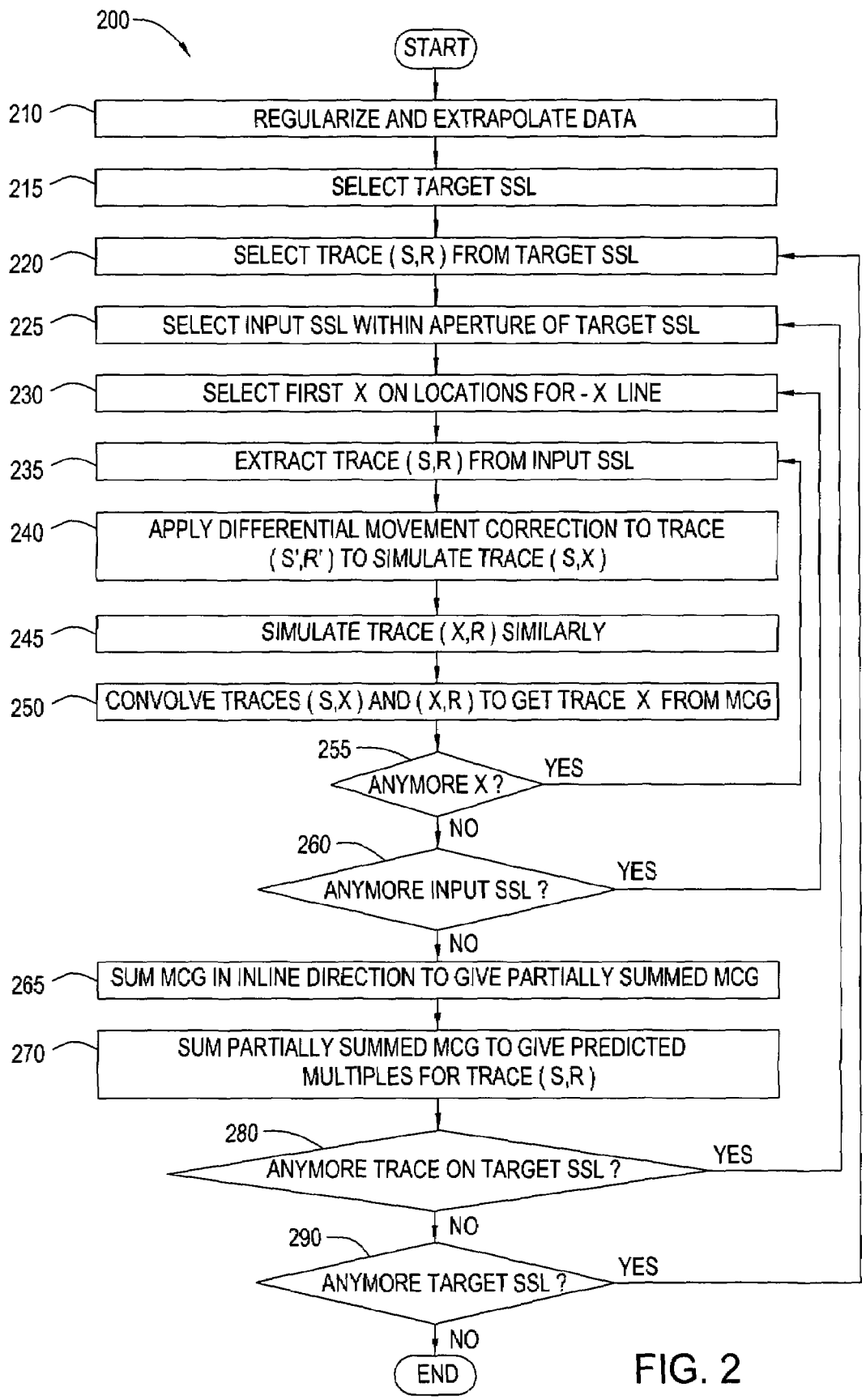
FIG. 2 illustrates a method for predicting surface multiples from a record of seismic data in accordance with one embodiment of the invention.

FIG. 2 illustrates a method 200 for predicting surface multiples from a record of seismic data in accordance with one embodiment of the invention. At step 210, the record of seismic data is preconditioned. That is, the record of seismic data is separated into subsurface lines (SSLs) and each SSL is regularized according to conventional regularization methods known by persons of ordinary skill in the art. Once regularized, the crossline offset between each source and receiver is zero and the inline offset between each source and receiver is regular. Once the record of seismic data has been regularized to subsurface lines, the regularized data are extrapolated according to conventional extrapolation methods known by persons of ordinary skill in the art. Once extrapolated, the gap between each source and the receiver nearest to the source on each SSL is filled with extrapolated receivers. As a result, each SSL has traces with zero crossline offset and regularly increasing inline offsets starting from zero.

Figure 3:
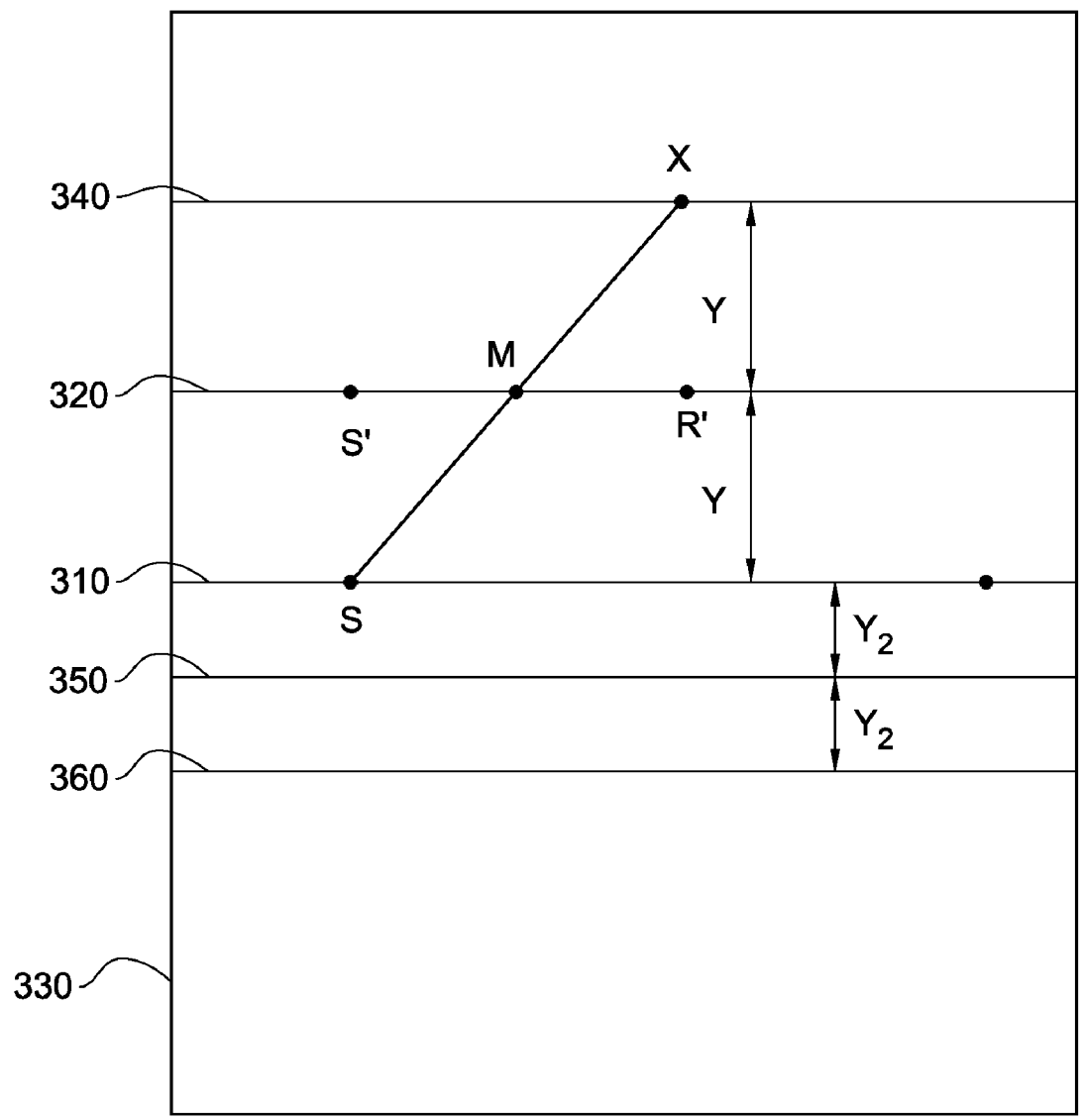
FIG. 3 illustrates a top view of a specific trace on the target SSL for which the surface multiples are to be predicted in accordance with one embodiment of the invention.

At step 215, a target SSL 310 is selected. The target SSL 310 is defined as the locations of the traces for which the surface multiples are to be predicted. In one embodiment, target SSL 310 is one of the SSL's that have been preconditioned. For purposes of illustrating embodiments of the invention, a specific trace on the target SSL for which the surface multiples are to be predicted has a source at S and a receiver at R, and is illustrated as trace (S, R) in FIG. 3. At step 220, the trace (S, R) is selected from the target SSL 310. At step 225, another SSL 320 (hereinafter referred to as "input SSL") within a specified crossline aperture 330 of the target SSL 310 is selected. The aperture 330 is generally specified by a maximum distance from the target SSL 310, which is generally positioned in the middle of the aperture 330. The aperture 330 generally consists of many potential input SSLs, one of which is the target SSL 310. As such, any input SSL within the aperture 330 may be selected at step 225, since eventually every input SSL within the aperture 330 will be processed. The size of the aperture 330 may be specified in step 215. The term "aperture" is used herein in relation to the location of the input SSL 320 and to the location of potential downward reflection points relative to the target SSL 310. It should be noted, however, that the crossline distance from the target SSL 310 to the potential downward reflection points is always twice that to the input SSL 320, and hence, the crossline extent of the aperture 330 defined in terms of potential downward reflection points is always twice that defined in terms of input SSL 320.

The target SSL 310 and the input SSL 320 are separated by a distance y. In one embodiment, the distance y between the target SSL 310 and the input SSL 320 may be computed and may vary along the input SSL 320 if it is not parallel to the target SSL 310. At step 230, a point X on a locations-for-X line 340 is selected. The point X corresponds to a potential downward reflection point for the surface multiples of trace (S, R). The locations-for-X line 340 is defined to be a distance of 2y from the target SSL 310.

At step 235, a trace on the input SSL 320 that corresponds to trace (S, X) (a potential trace) is identified or extracted; for purposes of illustrating embodiments of the invention that trace is referred to as trace (S', R'). Trace (S', R') corresponds to trace (S, X) because S' and S have the same inline location, R' and X have the same inline location and trace (S', R') has the same inline offset as trace (S, X) but zero crossline offset. Further, the midpoints of traces (S, X) and (S', R') are at the same location M. In another embodiment, the trace on input SSL 320 that has the closest actual offset to the offset of trace (S, X) and the same midpoint as trace (S, X) is extracted.

At step 240, a differential moveout correction is applied to trace (S', R') to simulate the trace (S, X). The differential moveout correction compensates for the difference in offset between the two traces, where the offset of a trace is defined to be the horizontal distance from the source to the receiver. The differential moveout correction is used here since traces (S, X) and (S', R') have the same midpoint location M. By applying the differential moveout correction, the source at location S' on the input SSL 320 is transferred to location S on the target SSL 310 and the receiver at location R' on the input SSL 320 is transferred to location X on the locations-for-X line 340. In one embodiment, the differential moveout correction is a differential normal moveout (NMO). Other differential moveout correction algorithms are also contemplated by embodiments of the invention. In another embodiment, a velocity model, e.g., stacking velocity model, is used in connection with the differential moveout correction. The stacking velocity model may include inline stacking velocities or crossline stacking velocities.

Once the trace (S, X) has been simulated, steps 235 through 240 are repeated to simulate a trace having a source located at X and a receiver located at R (hereinafter referred to as trace (X, R)) (at step 245). Trace (X, R) is simulated by extracting a trace that corresponds to trace (X, R) from the input SSL 320 and applying the differential moveout correction to that trace.

Once trace (S, X) and trace (X, R) have been simulated, the two traces are convolved to create a potential surface multiple trace for trace (S, R) corresponding to the downward reflection point X (step 250). This trace constitutes one trace from the multiple contribution gather (MCG) for trace (S, R). The MCG is generally defined as the set potential surface multiples for trace (S, R) corresponding to all potential downward reflection points in the aperture. Trace (S, X) and trace (X, R) may be convolved by any conventional methods generally known by persons of ordinary skill in the art.

At step 255, a determination is made as to whether another point (e.g., $X_2$) corresponding to a potential downward reflection point exists on the location-for-X line 340. If the answer is in the affirmative, processing returns to step 235 where a trace that corresponds to trace (S, $X_2$) is identified on the input SSL 320. Steps 235 through 250 are repeated until all potential downward reflection points on the location-for-X line 340 have been processed. At the end of step 255, an inline of potential surface multiples for trace (S, R) corresponding to all potential downward reflection points on the locations-for-X line is created in the MCG. If the answer to the query at step 255 is in the negative, then processing continues to step 260.

At step 260, a determination is made as to whether another input SSL (e.g., input SSL 350) exists within the aperture 330. If the answer is in the affirmative, then processing returns to step 230 where a point X on another locations-for-X line (e.g., locations-for-X line 360) is selected. The input SSL 350 is separated from the target SSL 310 by another distance, e.g., $Y_2$, and the locations-for-X line 360 is separated from the target SSL 310 by a distance of $2Y_2$. At the end of step 255 for the input SSL 350, another inline of potential surface multiples for trace (S, R) is created in the MCG. Steps 230 through 255 are repeated until all the input SSL's within the aperture 330 have been processed. At the end of step 260, the MCG is filled with inlines of potential surface multiples for trace (S, R) corresponding to all potential downward reflection points within the aperture 330. If the answer to the query at step 260 is in the negative, then processing continues to step 265.

At step 265, the traces in each inline from the MCG are added (stacked) to generate a series of inline-summed traces. In this manner, the MCG has been partially summed. At step 270, the inline-summed traces are added (stacked) to generate a trace of actual surface multiples for trace (S, R). In this manner, the surface multiples for trace (S, R) have been three dimensionally predicted. The surface multiple prediction described herein is three dimensional since the aperture 330 for the MCG spans an area of locations on the surface, as opposed to being restricted to a single SSL corresponding to the target SSL, as in a 2-D surface multiple prediction. In one embodiment, the traces in each crossline from the MCG are stacked to generate a series of crossline-summed traces and the series of crossline-summed traces are then stacked to generate the trace of actual surface multiples for trace (S, R).

At step 280, a determination is made as to whether another trace (e.g., trace ($S_2$, $R_2$)) on the target SSL 310 exists. If the answer is in the affirmative, then processing returns to step 225, where an input SSL within an aperture 330 of the target SSL 310 is selected. Steps 230 through 280 are repeated until the actual surface multiples for each trace on target SSL 310 are predicted. If the answer is in the negative, then processing continues to step 290.

At step 290, a determination is made as to whether another target SSL exists in the preconditioned record of seismic data. If the answer is in the affirmative, then processing returns to step 220, where a trace is selected from this next target SSL. Steps 225 through 290 are repeated until the surface multiples for every trace in the record of seismic data are predicted. In this manner, the surface multiples for every trace in the record of seismic data are three dimensionally predicted.

Figure 4:
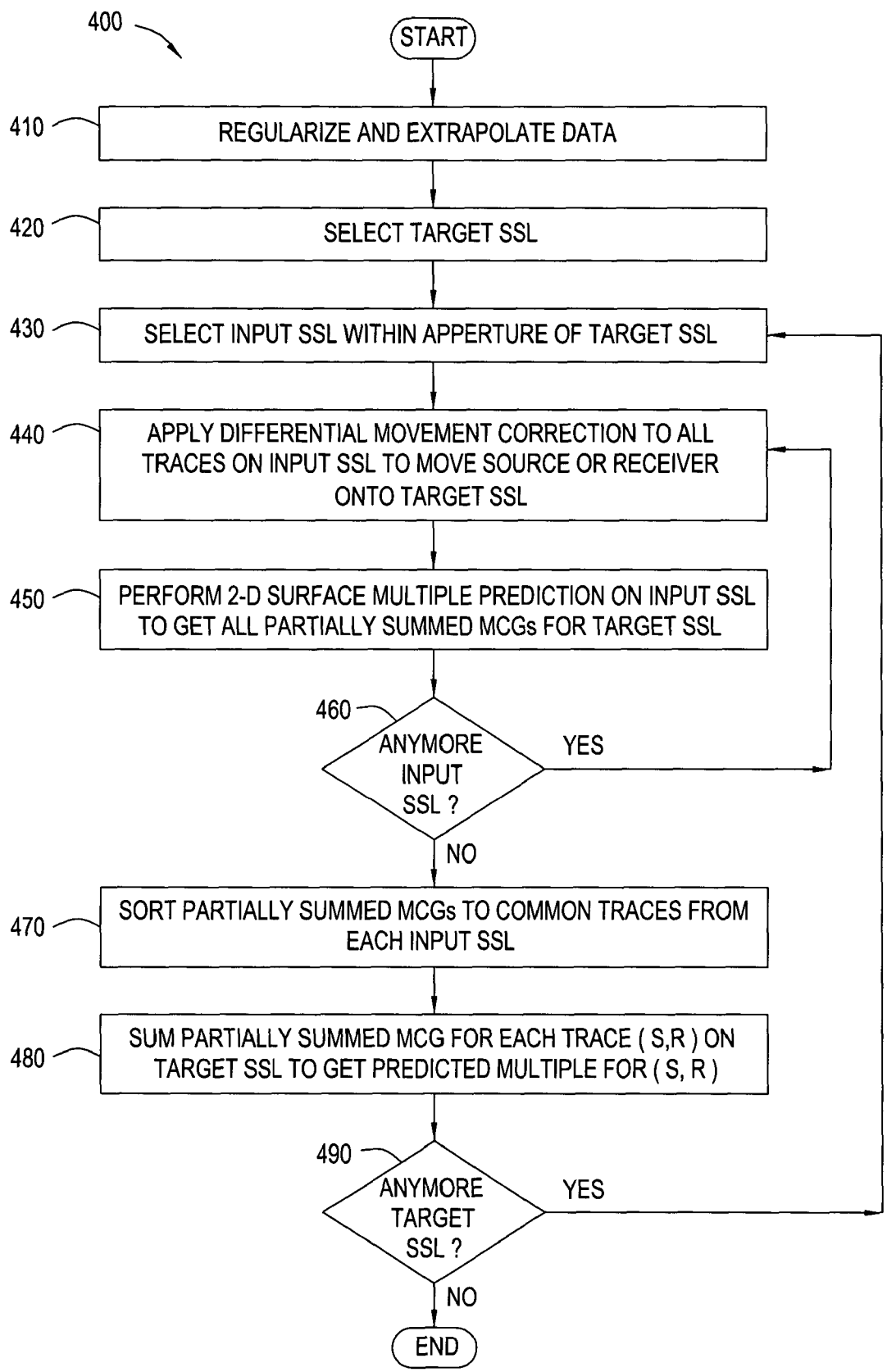
FIG. 4 illustrates a method for predicting surface multiples from a record of seismic data in accordance with another embodiment of the invention.

FIG. 4 illustrates a method 400 for predicting surface multiples from a record of seismic data in accordance with another embodiment of the invention. At step 410, the record of seismic data is preconditioned according to the regularization and extrapolation methods, as described above. The next two steps of method 400 are the same as steps 215 and 225. That is, at step 420, a target SSL 310 is selected. The target SSL 310 is defined as the location of the traces for which the surface multiples are to be predicted. In one embodiment, target SSL 310 is one of the SSL's that have been preconditioned. At step 430, the input SSL 320 within the aperture 330 of the target SSL 310 is selected.

At step 440, a differential moveout correction is applied to every trace on the input SSL 320, thereby changing the crossline offset of each trace to a distance of 2y, where y is the distance between the input SSL 320 and the target SSL 310, and leaving the inline offset and the midpoint M unchanged. The differential moveout correction may be applied prior to selecting the trace (S, R) from the target SSL 310 because the correction from trace (S', R') to trace (S, X) depends only on the source location S', the receiver location R' and the distance between the input SSL 320 and the target SSL 310, which is y. In one embodiment, the differential moveout correction is a differential normal moveout (NMO). Other differential moveout correction algorithms are also contemplated by embodiments of the invention. In another embodiment, a velocity model, e.g., stacking velocity model, is used in connection with the differential moveout correction. The stacking velocity model may include inline stacking velocities or crossline stacking velocities.

At step 450, a two-dimensional (2-D) surface multiple prediction is performed on the input SSL 320 to generate a sum of all potential surface multiples on an inline (corresponding to input SSL 320) in every MCG that corresponds to target SSL 310. In this manner, every MCG that corresponds to target SSL 310 has been partially computed and summed in the inline direction corresponding to input SSL 320. Step 450 is configured to perform all the operations of steps 220, 230, 235, 250, 255, 265 and 280. The 2-D surface multiple prediction may be performed using existing code and algorithms generally known by persons of ordinary skill in the art, with only minor modifications, if any. In this manner, a portion of the 3-D surface multiple prediction may be computed using existing 2-D surface multiple prediction algorithms applied to data from a single SSL, thereby making the process very efficient. Existing 2-D surface multiple prediction algorithms generally include a geometric spreading compensation correction to condition the data for a 2-D surface multiple prediction, and a rho-filter appropriate to a 2-D summation of the MCGs. Accordingly, in one embodiment of the invention, the geometric spreading correction is not to be applied, and the rho-filter is replaced with one configured for a 3-D surface multiple prediction.

At step 460, a determination is made as to whether another input SSL (e.g., input SSL 350) exists within the aperture 330. If the answer is in the affirmative, then processing returns to step 440, where the differential moveout correction is applied to every trace on input SSL 350. At the end of step 450 for input SSL 350, the inline sums of all potential surface multiples on another inline (corresponding to the input SSL 350) in every MCG corresponding to target SSL 310 will have been computed. Steps 440–450 are repeated until all the input SSL's within the aperture 330 have been processed. Thus, at the end of step 460, a series of sums of all potential surface multiples on every inline in every MCG corresponding to target SSL 310 has been generated. That is, for every trace on target SSL 310, the inline sums in the MCG for that trace have been computed for each inline within the aperture 330. If the answer to the query at step 460 is in the negative, then processing continues to step 470.

At step 470, the partially-summed surface multiple traces from all input SSLs are combined and sorted by trace order, such that all the partially summed traces (i.e., all the inline sums) corresponding to a given trace (S, R) on the target SSL 310 are adjacent to each other. The set of partially summed traces for a given trace (S, R) on the target SSL 310 constitutes a "crossline MCG," which is not the same as a crossline from the MCG since the crossline MCG consists of traces after summation in the inline direction. At step 480, the traces in each crossline MCG are summed to generate the actual surface multiples for each trace on target SSL 310.

In one embodiment, if the record of seismic data is irregular in the crossline direction (i.e., y varies along the line because the input and target SSLs are not parallel), then the traces in the crossline MCG will not be regularly spaced either. In this case, it may be necessary to regularize the crossline MCG before it can be summed. In another embodiment, if the trace spacings between input SSLs are too large, then the MCGs may be aliased according to conventional aliasing criteria known by persons of ordinary skill in the art. In this case, the input SSLs may be interpolated to have a finer trace spacing before stacking. Alternatively, the record of seismic data may be interpolated to simulate SSLs between the SSLs that were actually recorded.

At step 490, a determination is made as to whether another target SSL exists in the preconditioned record of seismic data. If the answer is in the affirmative, then processing returns to step 430, where an input SSL within the aperture of the next target SSL is selected. Steps 430 through 490 are repeated until the surface multiples for every trace in the record of seismic data are predicted. In this manner, the surface multiples for every trace in the record of seismic data are three dimensionally predicted.

Embodiments of the invention described with reference to method 400 have many advantages, including ability to compute each inline in the MCG by processing data from each input SSL independently and the ability to use conventional 2-D surface multiple prediction algorithms with only minor modifications. The use of differential moveout correction to simulate the required traces for the prediction also makes for a very simple and efficient algorithm compared to those that use migration-based or interpolation-based methods. In addition, because the differential moveout correction is applied to prestack data, the difference between the regularized offset on the input SSL and the desired offset is reduced compared to using stack data as proposed in other methods, thereby reducing the timing errors associated with approximations in the differential moveout correction procedure. The amplitudes are also similarly improved, notably because stack data have unpredictable multiple amplitudes.

Figure 5:
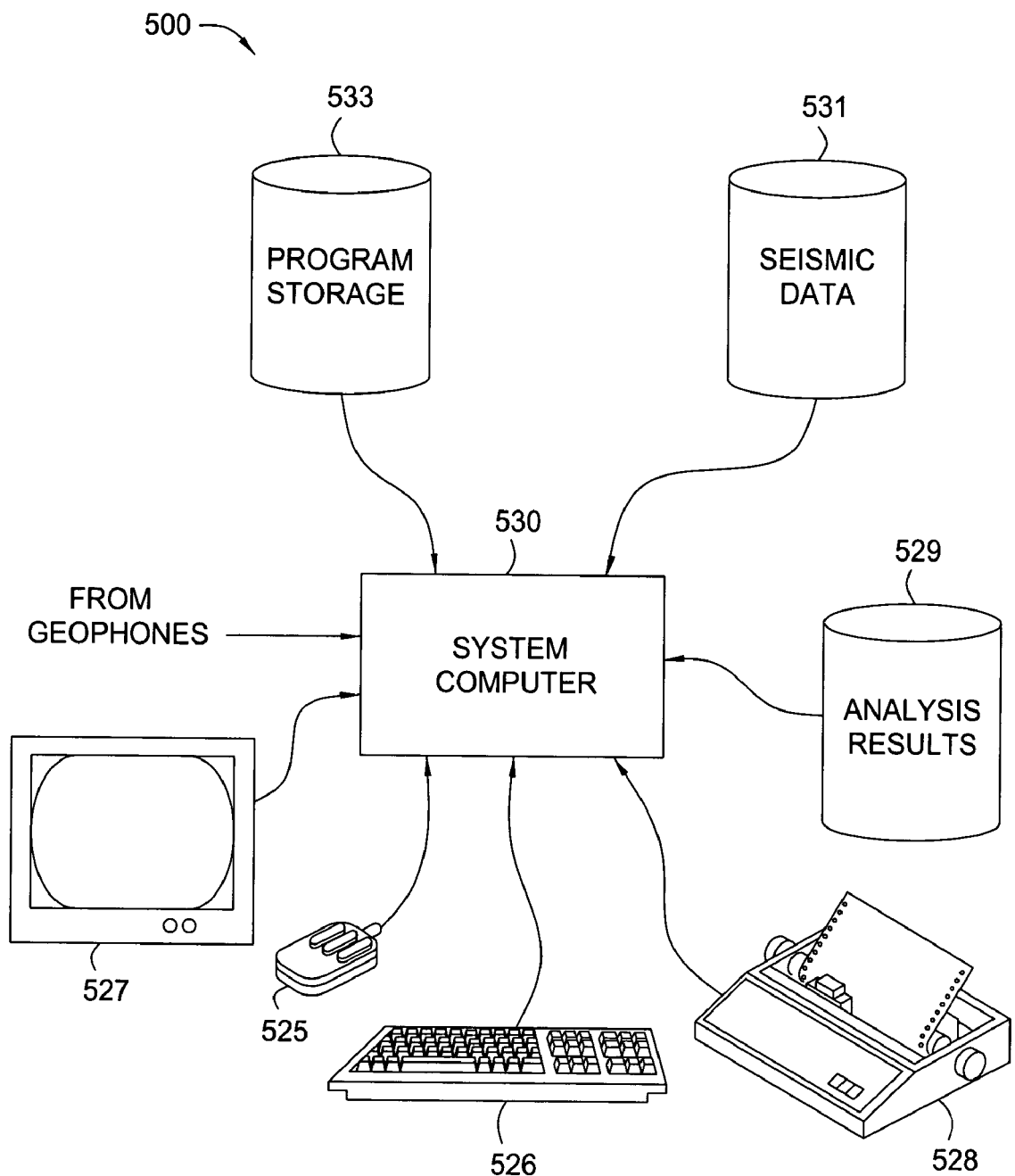
FIG. 5 illustrates a computer network into which embodiments of the invention may be implemented.

FIG. 5 illustrates a computer network 500, into which embodiments of the invention may be implemented. The computer network 500 includes a system computer 530, which may be implemented as any conventional personal computer or workstation, such as a UNIX-based workstation. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one embodiment, seismic data from geophones are stored in disk storage device 531. The system computer 530 may retrieve the appropriate data from the disk storage device 531 to perform the 3-D surface multiple prediction according to program instructions that correspond to the methods described herein. The program instructions may be written in a computer programming language, such as C++, Java and the like. The program instructions may be stored in a computer-readable memory, such as program disk storage device 533. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 530 presents output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with geophones (either directly or via a recording unit, not shown), to receive signals indicative of the reflected seismic energy. These signals, after conventional formatting and other initial processing, are stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for predicting a plurality of surface multiples for a plurality of traces in a record of seismic data, comprising:
    (a) selecting a target subsurface line;
    (b) selecting an input subsurface line within an aperture of the target subsurface line;
    (c) selecting one or more points on a line twice the distance from the target subsurface line to the input subsurface line, wherein each point corresponds to a potential downward reflection point of the surface multiples for a trace in the record;
    (d) generating an inline of potential surface multiples for the trace corresponding to the one or more points on the line;
    (e) repeating steps (c) through (d) for each input subsurface line within the aperture of the target subsurface line to generate a plurality of potential surface multiples for the trace corresponding to each input subsurface line within the aperture;
    (f) adding the plurality of potential surface multiples corresponding to each input subsurface line within the aperture to generate a surface multiple for the trace; and
    (g) storing the surface multiple for the trace to memory.

2. The method of claim 1, further comprising:
    preconditioning the record into a plurality of subsurface lines; and
    repeating steps (a) through (g) for each preconditioned subsurface line to generate the surface multiples for the traces in the record, wherein each preconditioned subsurface line is the target subsurface line.

3. The method of claim 1, wherein generating the potential surface multiple for the trace corresponding to the point comprises:
    simulating a first potential trace having a source located at the same location as a source for the trace and a receiver located at the point; and
    simulating a second potential trace having a source located at the point and a receiver located at the same location as a receiver for the trace.

4. The method of claim 3, further comprising convolving the first potential trace and the second potential trace to generate a potential surface multiple for the trace corresponding to the point.

5. The method of claim 3, wherein simulating the first potential trace comprises:
    extracting a first simulating trace from the input subsurface line, wherein the first simulating trace corresponds to the first potential trace; and
    applying a differential moveout correction to the first simulating trace.

6. The method of claim 5, wherein the differential moveout correction is a differential normal moveout correction.

7. The method of claim 3, wherein simulating the second potential trace comprises:
    extracting a second simulating trace from the input subsurface line, wherein the second simulating trace corresponds to the second potential trace; and
    applying a differential moveout correction to the second simulating trace.

8. The method of claim 7, wherein the differential moveout correction is a differential normal moveout correction.

9. The method of claim 1, further comprising, prior to selecting the target subsurface line:
    separating the record of seismic data into a plurality of subsurface lines;
    regularizing the subsurface lines; and
    extrapolating the subsurface lines.

10. The method of claim 9, wherein selecting the target subsurface line comprises selecting the target subsurface line from the regularized and extrapolated subsurface lines.

11. The method of claim 1, wherein the potential surface multiple constitutes a trace from a multiple contribution gather for the trace.

12. A method for predicting a plurality of surface multiples for a plurality of traces in a record of seismic data, comprising:
(a) selecting a target subsurface line;
(b) selecting an input subsurface line within an aperture of the target subsurface line;
(c) applying a differential moveout correction to the input subsurface line;
(d) performing a two dimensional surface multiple prediction on the input subsurface line to generate a sum of a plurality of potential surface multiples on an inline in one or more multiple contribution gathers that correspond to the target subsurface line, wherein the inline corresponds to the input subsurface line;
(e) repeating steps (c) through (d) for every input subsurface line within the aperture to generate a plurality of sums of potential surface multiples on every inline in the one or more multiple contribution gathers;
(f) sorting the plurality of sums of potential surface multiples such that each sum of potential surface multiples corresponding to a trace in the record is adjacent to each other;
(g) adding the adjacent potential surface multiples corresponding to the trace to generate a surface multiple for the trace; and
(h) storing the surface multiple for the trace to a computer readable medium.

13. The method of claim 12, further comprising:
preconditioning the record into a plurality of subsurface lines; and
repeating steps (a) through (h) for each preconditioned subsurface line to generate the surface multiples for the traces in the record.

14. The method of claim 12, wherein the differential moveout correction is a differential normal moveout correction.

15. The method of claim 12, further comprising, prior to selecting the target subsurface line:
separating the record of seismic data into a plurality of subsurface lines;
regularizing the subsurface lines; and
extrapolating the subsurface lines.

16. The method of claim 15, wherein selecting the target subsurface line comprises selecting the target subsurface line from the regularized and extrapolated subsurface lines.

17. A computer readable medium containing a program which, when executed, performs an operation comprising:
(a) selecting a target subsurface line;
(b) selecting an input subsurface line within an aperture of the target subsurface line;
(c) selecting one or more points on a line twice the distance from the target subsurface line to the input subsurface line, wherein each point corresponds to a potential downward reflection point of the surface multiples for a trace in a record of seismic data;
(d) generating an inline of potential surface multiples for the trace corresponding to the one or more points on the line;
(e) repeating steps (c) through (d) for each input subsurface line within the aperture of the target subsurface line to generate a plurality of potential surface multiples for the trace corresponding to each input subsurface line within the aperture;
(f) adding the plurality of potential surface multiples corresponding to each input subsurface line within the aperture to generate a surface multiple for the trace; and
(g) storing the surface multiple for the trace to memory.

18. The computer readable medium of claim 17, wherein the program further contains operation comprising:
preconditioning the record into a plurality of subsurface lines; and
repeating steps (a) through (g) for each preconditioned subsurface line to generate the surface multiples for the traces in the record.

19. The computer readable medium of claim 17, wherein generating the potential surface multiple for the trace corresponding to the point comprises:
simulating a first potential trace having a source located at the same location as a source for the trace and a receiver located at the point; and
simulating a second potential trace having a source located at the point and a receiver located at the same location as a receiver for the trace.

20. The computer readable medium of claim 19, wherein the program further contains operation comprising convolving the first potential trace and the second potential trace to generate a potential surface multiple for the trace corresponding to the point.

21. The computer readable medium of claim 19, wherein simulating the first potential trace comprises:
extracting a first simulating trace from the input subsurface line, wherein the first simulating trace corresponds to the first potential trace; and
applying a differential moveout correction to the first simulating trace.

22. The method of claim 21, wherein the differential moveout correction is a differential normal moveout correction.

23. A computer readable medium containing a program which, when executed, performs an operation comprising:
(a) selecting a target subsurface line;
(b) selecting an input subsurface line within an aperture of the target subsurface line;
(c) applying a differential moveout correction to the input subsurface line;
(d) performing a two dimensional surface multiple prediction on the input subsurface line to generate a sum of a plurality of potential surface multiples on an inline in one or more multiple contribution gathers that correspond to the target subsurface line, wherein the inline corresponds to the input subsurface line;
(e) repeating steps (c) through (d) for every input subsurface line within the aperture to generate a plurality of sums of potential surface multiples on every inline in the one or more multiple contribution gathers;
(f) sorting the plurality of sums of potential surface multiples such that each sum of potential surface multiples corresponding to a trace in the record is adjacent to each other; and
(g) adding the adjacent potential surface multiples corresponding to the trace to generate a surface multiple for the trace; and
(g) storing the surface multiple for the trace to memory.

* * * * *

UNITED STATES PATENT AND TRADEMARK OFFICE
CERTIFICATE OF CORRECTION

PATENT NO. : 7,181,347 B2
APPLICATION NO. : 10/668927
DATED : February 20, 2007
INVENTOR(S) : Ian Moore Page 1 of 1

It is certified that error appears in the above-identified patent and that said Letters Patent is hereby corrected as shown below:

On the Title page, item (73), "Westerngeco, L.L.C." should be changed to
-- WesternGeco, L.L.C. --.

On the Title page, item (74), "Westerngeco, L.L.C." should be changed to
-- WesternGeco, L.L.C. --.

Signed and Sealed this

Fifth Day of February, 2008

JON W. DUDAS
*Director of the United States Patent and Trademark Office*